(12) United States Patent
Marioni (10) Patent No.: US 8,017,007 B2
(45) Date of Patent: Sep. 13, 2011

(54) FILTERING UNIT FOR AN AQUARIUM

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 275 days.

(21) Appl. No.: 12/435,210

(22) Filed: May 4, 2009

(65) Prior Publication Data

US 2009/0289001 A1    Nov. 26, 2009

(30) Foreign Application Priority Data

May 20, 2008 (EP) .................................. 08425359

(51) Int. Cl.
*A01K 63/04* (2006.01)
(52) U.S. Cl. .................. 210/167.21; 210/416.2; 119/260
(58) Field of Classification Search ............. 210/167.21, 210/167.22, 167.27, 416.2; 119/259, 260
See application file for complete search history.

(56) References Cited

U.S. PATENT DOCUMENTS

| | | | |
|---|---|---|---|
| 3,554,375 A * | 1/1971 | Willinger | 210/167.25 |
| 5,318,701 A | 6/1994 | Wang | |
| 5,366,618 A | 11/1994 | Foster | |
| 5,782,204 A | 7/1998 | Rahn | |
| 6,796,273 B2 * | 9/2004 | Muscarella | 119/263 |
| 2004/0134844 A1 | 7/2004 | McGrath | |

* cited by examiner

*Primary Examiner* — Fred Prince
(74) *Attorney, Agent, or Firm* — Akerman Senterfitt (57) ABSTRACT

A filtering unit (1) for an aquarium is described, said filtering unit (1) comprising a closed casing (2), which is to be immersed in a liquid, inlet means (3), a liquid path (4) passing through filters (8), outlet means (5, 15-18), an electric pump assembly (6) for forcing liquid to circulate along said liquid path (4). The outlet means (5, 15-18) comprise a multiple outlet selector (18) which may allow selection of outlets (15-17), in particular in a vertical direction.

8 Claims, 10 Drawing Sheets

FILTERING UNIT FOR AN AQUARIUM

FIELD OF THE INVENTION

The present invention relates to a filtering unit for an aquarium, said filtering unit comprising a closed casing to be immersed in the aquarium's liquid, inlet means for allowing said liquid inflow, a liquid path such as to force said liquid to pass through filters, outlet means for allowing said liquid outflow, an electric pump assembly for forcedly circulate said liquid along said liquid path.

KNOWN ART

An aquarium usually comprises a tank filled with a liquid (water), in which fish and other organisms may live. With time, the liquid tends to become turbid and therefore has to be depurated.

A filtering unit is usually employed for cleaning the liquid. Basically, such a filtering unit forces the liquid to pass through at least a filtering body which is disposed inside the casing of the filtering unit. For example, some filtering units provide a sequential path extending between a chemical filter provided with a carbon layer, a biological filter provided with a layer of razor clams, and a mechanical filter provided with a sponge layer and a natural fiber layer.

Sometimes, the filtering unit also has other tasks, like aerating the liquid, in order to introduce oxygen, which is vital for organism survival, and providing liquid mixing, by a suitable circulation, in order to avoid mud formation.

Nevertheless, tank liquid circulation may not always have to proceed in the same direction, since there may be areas of the tank which require a mixing according to a first type of circulation and other tank areas which require a mixing according to another type of circulation.

Therefore, sometimes a user has to reposition the filtering unit to other places inside the tank. But this isn't always an easy task; for example, if the unit has to be lowered, the user has to introduce a hand into the tank; moreover, if the supporting means of the filtering unit are of the suction cup type, this operation would be impossible, since it would require emptying the tank.

Moreover, there are different ways for letting liquid flow out of the filtering unit; sprays or spray-bar diffusers are known, which are sold as separate components, and which replace the traditional means, and therefore require the user to introduce her or his hands into the liquid.

As can be seen, managing a filtering unit is not a simple task for an aquarium owner, especially an inexperienced one.

The object of the present invention is to simplify the tasks required by an aquarium owner, allowing different circulations of liquid, in order to provide different types of mixing.

Therefore, the technical problem to be solved by the invention is to envisage a filtering unit having characteristics which overcome the drawbacks of the known art.

SUMMARY OF THE INVENTION

This technical problem is solved by a filtering unit for an aquarium, said filtering unit comprising a closed casing to be immersed in the aquarium's liquid, inlet means for allowing liquid inflow, a liquid path such as to force said liquid to pass through filters, outlet means for allowing said liquid outflow, an electric pump assembly for forcing the said liquid to circulate along said liquid path, wherein said outlet means comprise a multiple outlet selector so as to allow selection of an outlet among a plurality of outlets.

Preferably, these outlet means comprise at least two outlets, positioned at different vertical heights, in particular a lower outlet and an upper outlet provided above said lower outlet. In this way, a selection among different circulations of liquid inside the tank is provided, without the need to vertically reposition said filtering unit.

According to a particularly preferred embodiment, the multiple outlet selector is formed by a tube, having a substantially vertical axis, which is rotatable between a first position, which connects the liquid path to the lower outlet so as to let liquid exit the filtering unit from the lower outlet, and a second position, for connecting said liquid path to the upper outlet, for letting liquid exit the filtering unit from the upper outlet.

This embodiment may also provide outlet means further comprising an intermediate outlet, in particular of the spray type, placed in an intermediate position between the upper and lower outlet, and that the multiple outlet selector is capable to be positioned in a third position, connecting the liquid path to the intermediate outlet, so that the liquid may exit from said intermediate outlet. In this way it is possible to avoid the need to replace a traditional outlet means with a spray-like outlet means, since this type of outlet is already present in the filtering unit.

The multiple outlet selector comprises preferably a knob which protrudes upwardly and is rotatable, step by step, in order to select the outlet of said filtering unit. Therefore, preferably, the user is not required to insert a hand into the liquid for modifying the position of the multiple outlet selector.

Preferably, the filtering unit comprises a supporting body to be applied to the aquarium tank wall; the supporting body supports the casing, by means of slots which receive supporting pins fixed, in particular integral, with the casing. According to an advantageous form of this embodiment, the slots comprise a first inclined guide, so that to allow insertion of supporting pins, by means of a downward inclined movement, so that to reach an extraction position; the slots comprise a rotational surface, such as to allow rotation of the supporting pins up to an operating position; the slots further comprise vertical blocking means and the supporting pins comprise vertical blocking counter-means, for interlocking and blocking vertical movements of the supporting pins, so that to hold the casing in a vertically locked position. Therefore, the filtering unit may remain fixed in an operating position, nonetheless allowing its extraction by simple and intuitive movements, such as a rotation towards the extraction position, and disengaging along an inclined direction. If the upper part of the filtering unit is positioned above water level, the extraction and insertion of said unit may be obtained without contacting the liquid.

According to an advantageous embodiment of the present invention, the casing of the filtering unit is closed by a lid, positioned in an upper position, whereas the electric pump assembly is arranged in a lower position, in order to allow filter extraction from above, once the lid has been removed. Therefore, if the lid is put above water level, it is possible to change the filters, without hands getting wet.

As can be seen, the invention's purpose is to provide a "fool proof" filtering unit.

The characteristics and advantages according to the invention will become apparent from the following description, as well as examples of preferred embodiments, which are only illustrative and non limiting, with reference to the appended drawings.

BRIEF DESCRIPTION OF THE DRAWINGS

In particular

DETAILED DESCRIPTION

Figure 1:
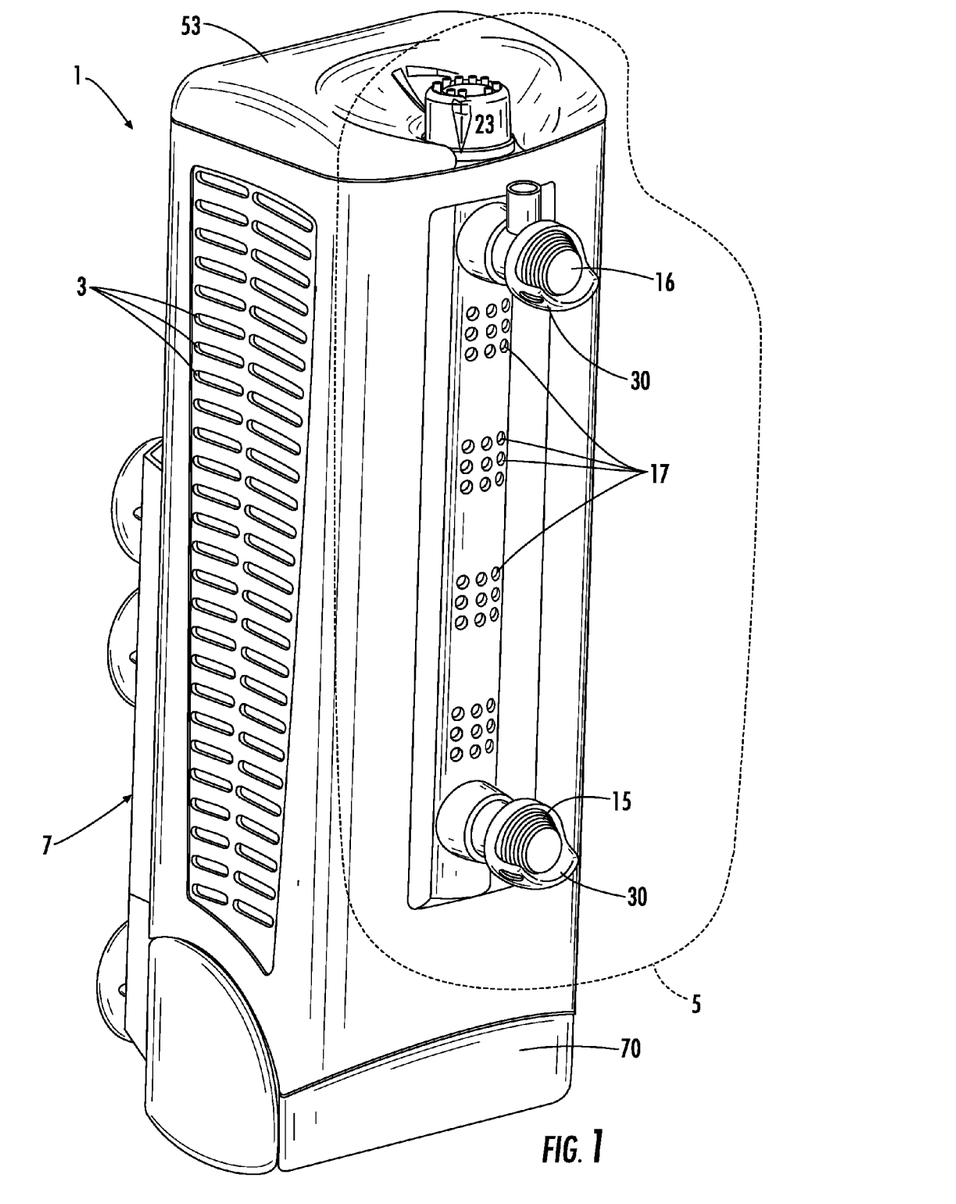
FIG. 1 shows a perspective view of a filtering unit according to the invention.
Figure 2:
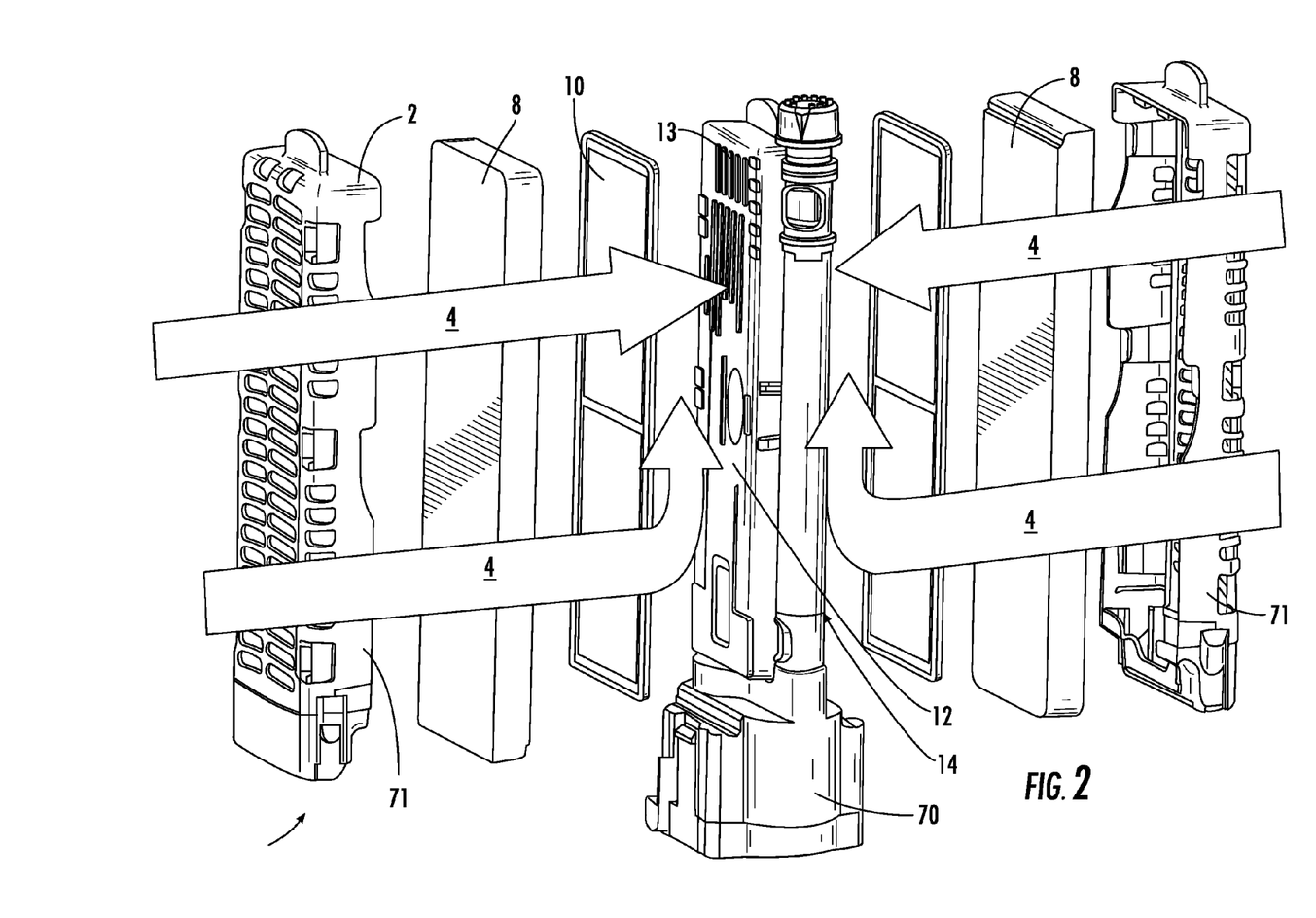
FIG. 2 shows a perspective exploded view of the filtering unit of FIG. 1, wherein a portion of liquid path is highlighted.

A filtering unit according to the present invention is referenced with 1; it comprises a casing 2 of plastic material, comprised of two lateral interlocked parts 71, which internally enclose the filtering components, a lid 53 in an upper position and a lower enclosure 70 in a lower position; the shape of casing 2 is substantially a parallelepiped whose major dimension is in a vertical direction. The casing 2 is usually introduced inside an aquarium tank, which is conventional and therefore not shown. The filtering unit 1 is supported by a tank wall by means of a supporting body 7, which may be applied to the wall, as shown in the following description.

The filtering unit 1 comprises
inlet means 3, which allow liquid to enter the filtering unit;
a liquid path 4, along which the liquid flows through filters and is depurated;
outlet means 5, which allow the cleaned liquid to exit towards the aquarium tank;
an electric pump assembly 6, which draws liquid from the inlet means 4 and pushes it towards the outlet means 5 through the liquid path 4.

In the present embodiment, the inlet means are substantially comprised of slots 3 provided on the casing 2, in particular on lateral portions 71 of casing 2, said slots forming the liquid inlet and the starting point of liquid path 4.

The electric pump assembly 6 is housed inside said casing 2, in particular in said lower enclosure 70; the electric pump assembly 6 provides an electric pump, not shown, since of the conventional type, capable to force the liquid flow. The electric pump assembly 6 is placed in the liquid path in an intermediate position; therefore, it is placed neither at the beginning nor at the end of liquid path.

The present filtering unit comprises two first mechanical filters 8, of sponge-like material, directly applied on the internal side of casing 2, two second mechanical filters 10, made of a thin layer of non-woven textile, which is supported by a small frame made of plastic material, which is fixed to the casing 2, a single chemical-biological filter 14 which is encased in a casing 12 provided with slots 13 which are placed in an upper position. Each second mechanical filter 10 is positioned at a distance from the chemical-biological filter 14, such as to form a rising chamber 11, in which the liquid rises until it reaches the slots 13.

The liquid path 4 is such as to allow liquid pass through said filters 8, 10, 14; therefore, liquid path 14, in its present embodiment, may be described as follows:
inflow through slots 3;
horizontal passage through one of said first mechanical filters 8;
horizontal passage through one of second mechanical filters 10;
rising passage in one of said two rising chambers 11;
inflow through slots 13, into said chemical-biological filter 14 and falling through said chemical-biological filter 14;
passage through said electric pump assembly 6;
rising outflow through said outlet means 5.

Outlet means 5 comprise following three outlets:
a lower outlet 15, in a lower position;
an upper outlet 16, in an upper position, vertically positioned above said lower outlet 15;
an intermediate outlet 17, of the spray type, in an intermediate position with respect to said lower 15 and upper 16 outlet; said spray outlet 17 comprising a plurality of holes.

Flush with said lower 15 and upper 16 outlets are flow deflectors 30, which are manually rotatable by 360° around horizontal axes of outlets 15 and 16, as well as in a limited way around horizontal axes perpendicular to said axes of outlets 15, 16, in order to obstruct, even only slightly, the liquid forward outflow, in order to direct the outgoing liquid upwards or downwards.

The outlet means comprise an attachment 31 for an air tube, for example of the "Venturi" type, for additional oxygenation of the aquarium.

Figure 3:
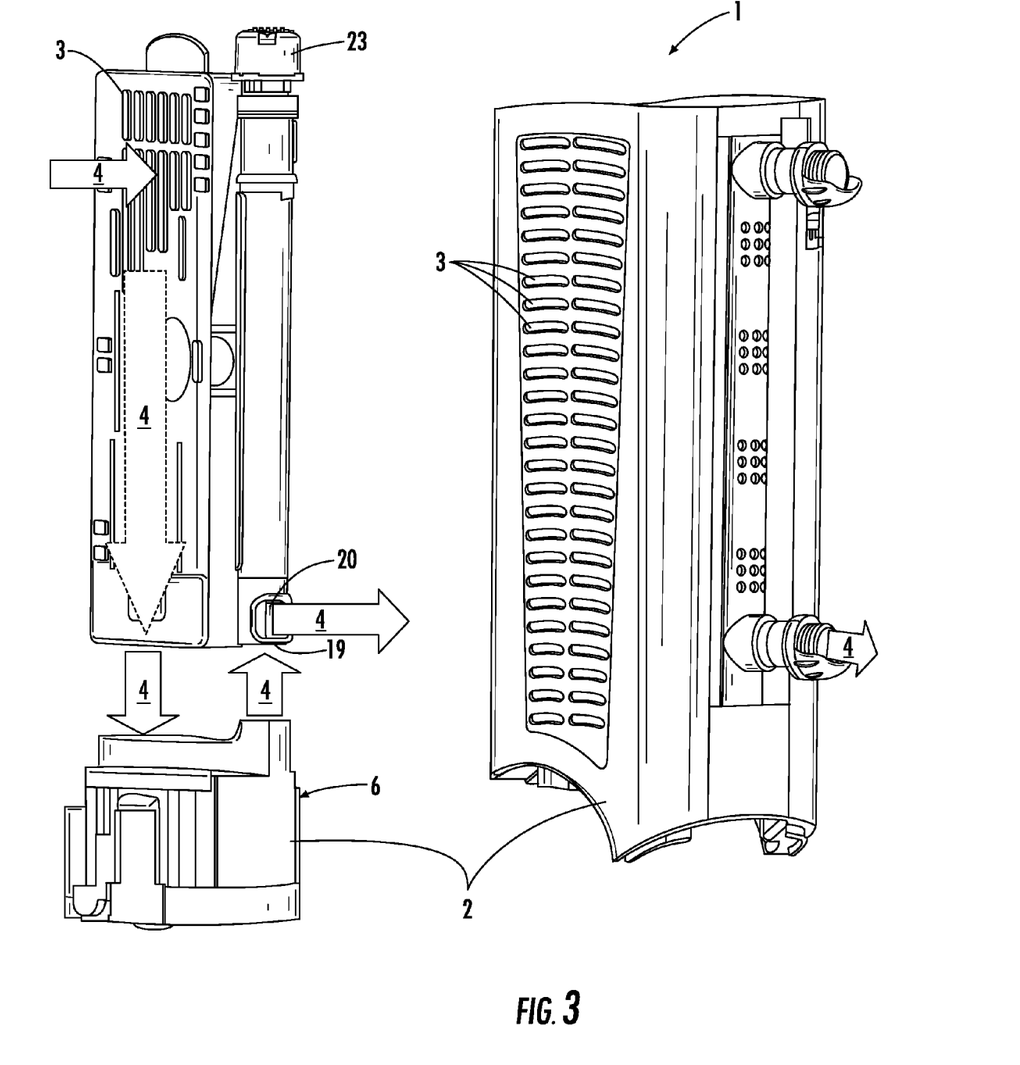
FIGS. 3 and 4 show perspective exploded views of portions of filtering unit of FIG. 1, when an outlet is selected.
Figure 4:
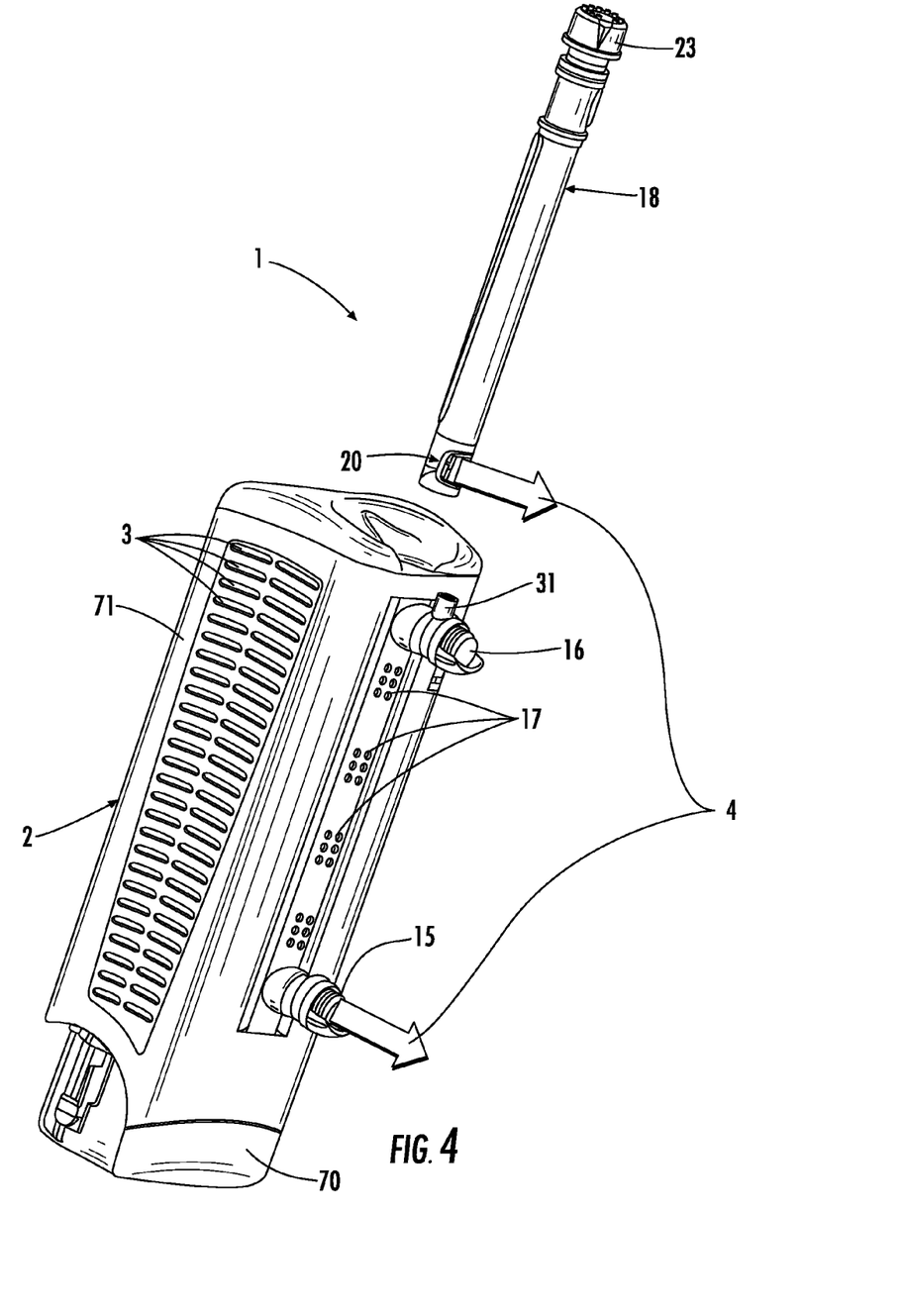
Figure 5:
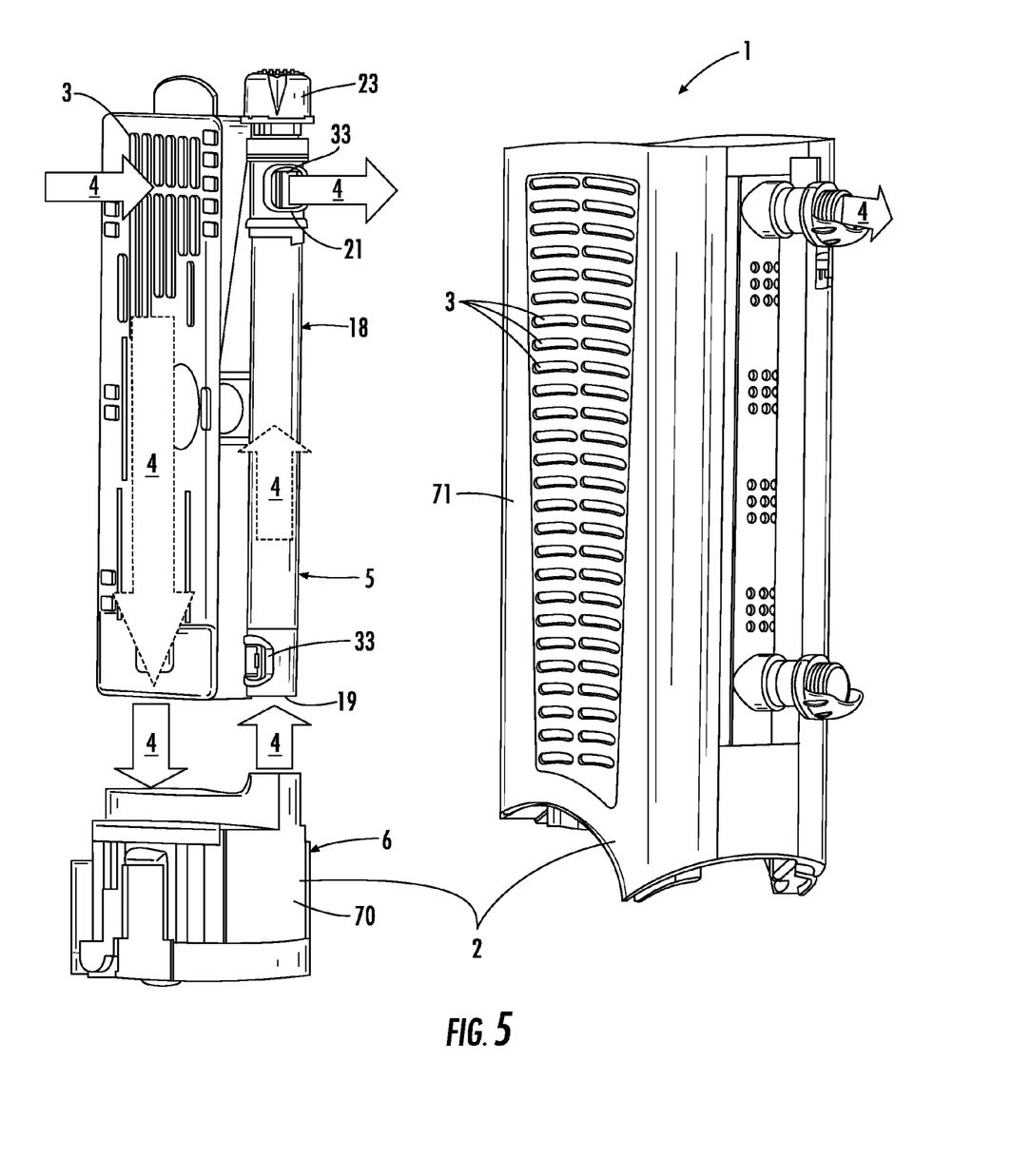
FIGS. 5 and 6 show perspective exploded views of portions of filtering unit of FIG. 1, when a further outlet is selected.
Figure 6:
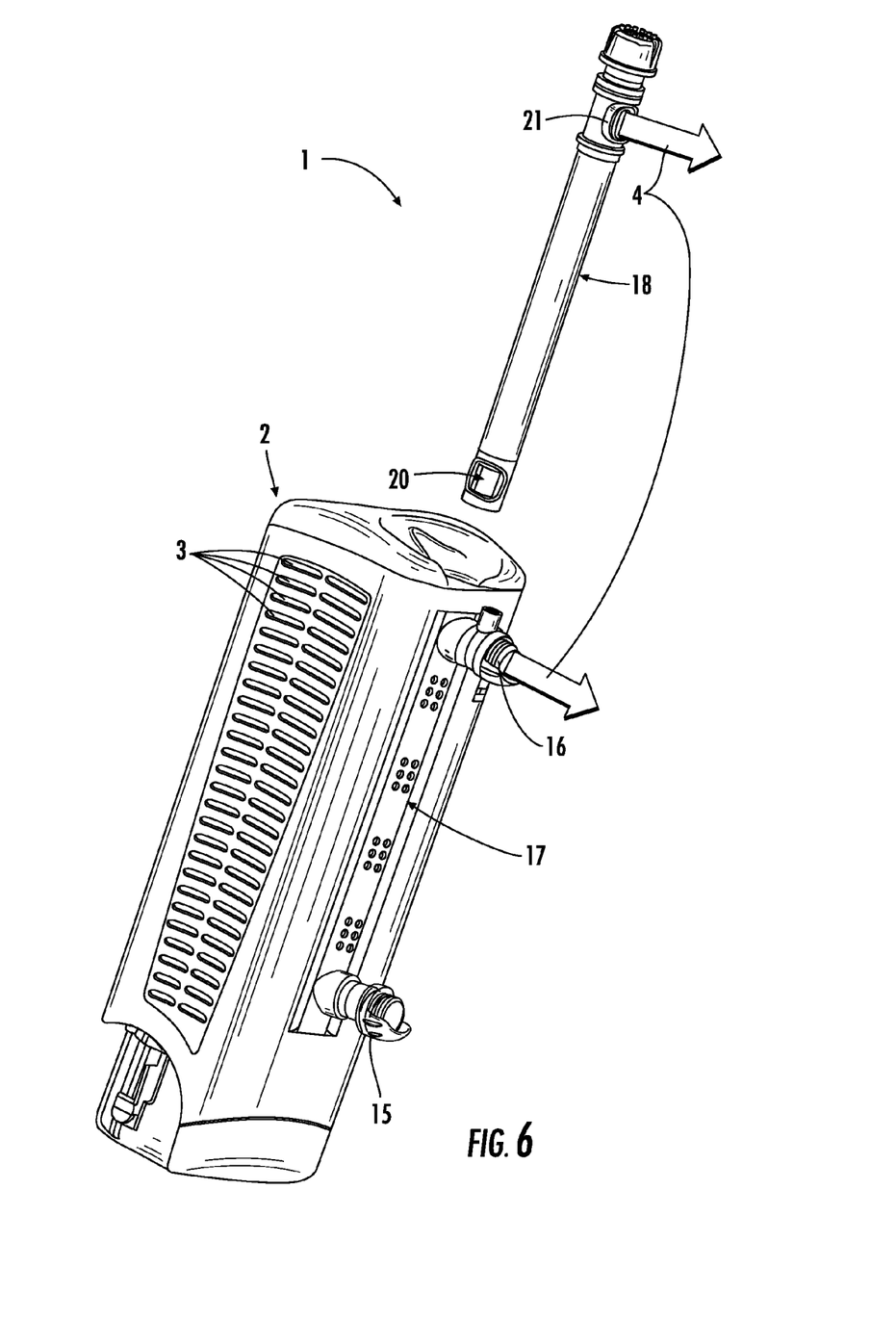
Figure 7:
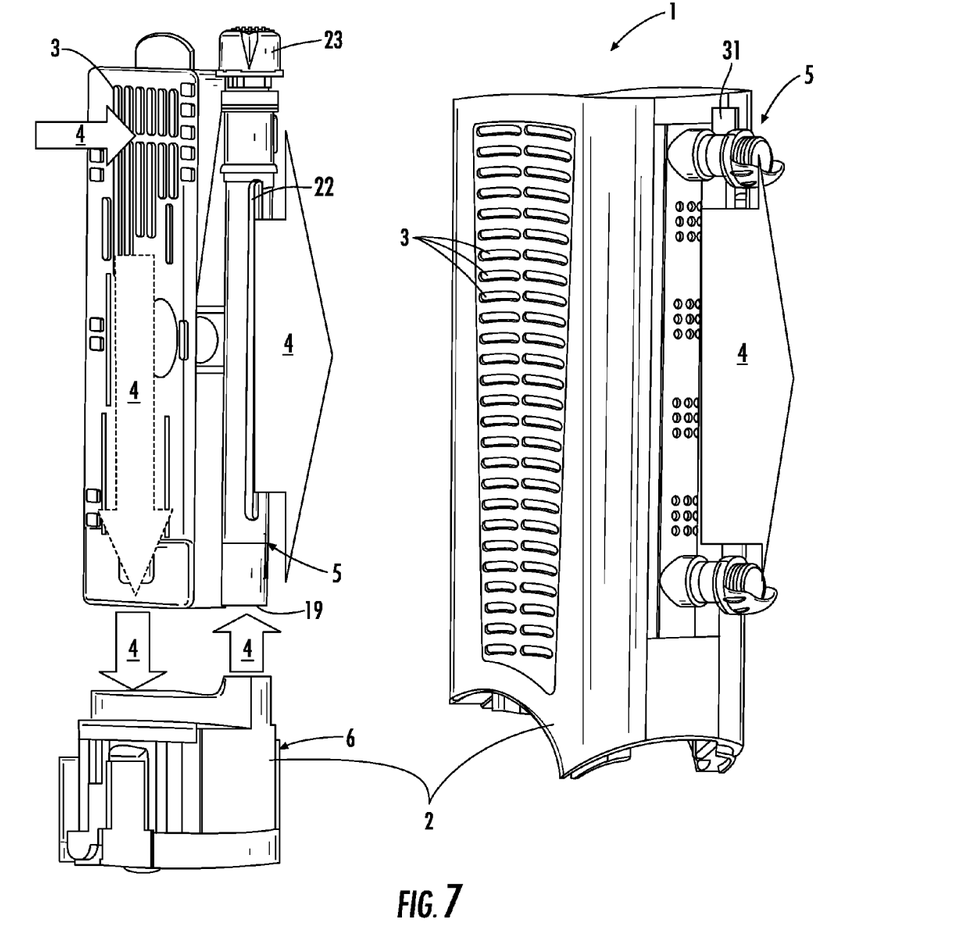
FIGS. 7 and 8 show perspective exploded views of portions of filtering unit of FIG. 1, when a further outlet is selected.
Figure 8:
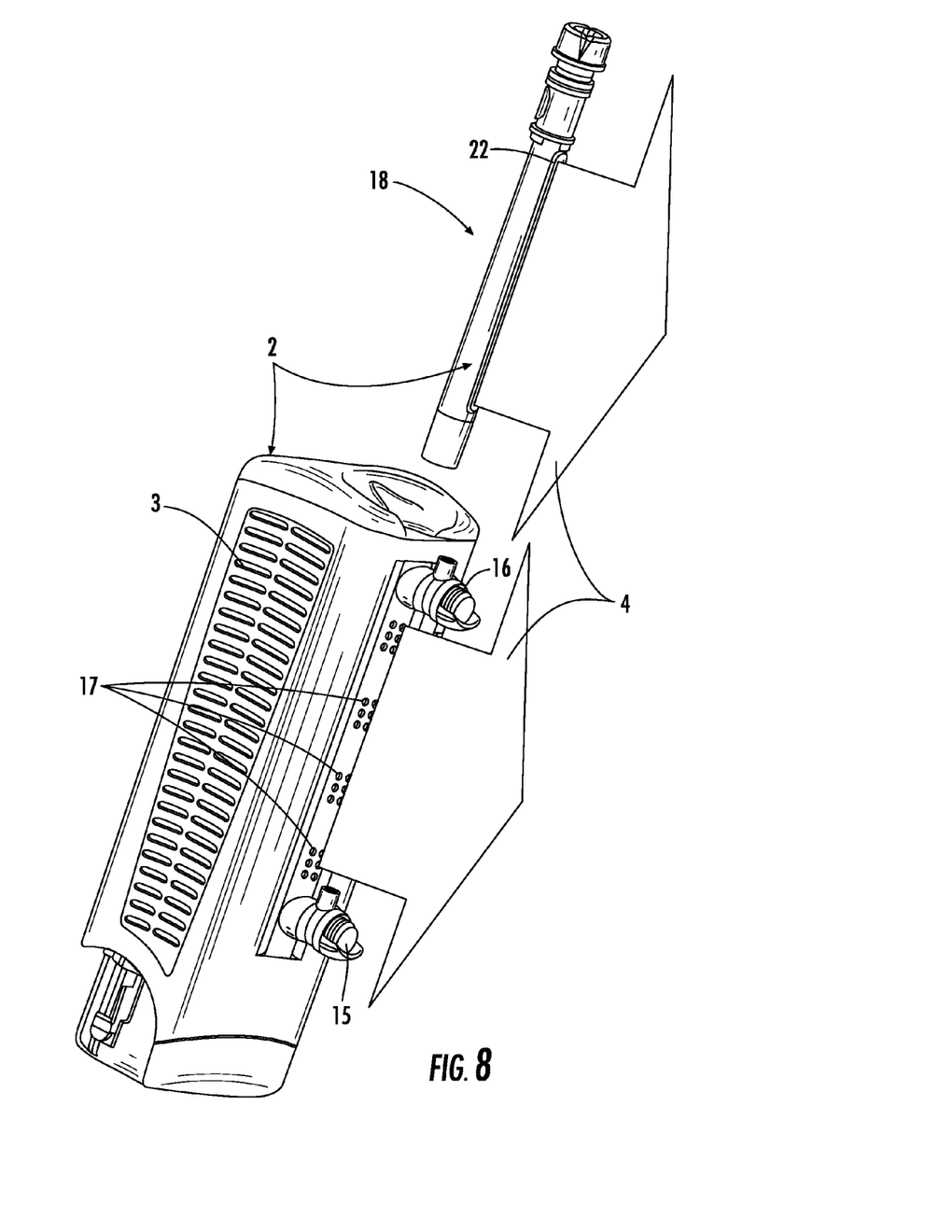

Advantageously, the outlet means 5 comprise a multiple outlet selector 18, which may be positioned in one of following positions:
a first position, shown in FIGS. 3 and 4, which communicates the liquid path 4 with the lower outlet 15, so that liquid exits the filtering unit through lower outlet 15,
a second position, shown in FIGS. 5 and 6, which communicates the liquid path 4 with the upper outlet 16, so that liquid exits the filtering unit through the upper outlet 16;
a third position, shown in FIGS. 7 and 8, which communicates the liquid path with the intermediate outlet 17, so that liquid exits the filtering unit through the further outlet 17.

Advantageously, the multiple outlet selector 18 comprises a tube, having a substantially vertical axis; the multiple outlet selector 18 has an inlet 19, in a lower position, which communicates with the pressure side opening 9 of electric pump assembly 6, so that the liquid flow 4 is forced through multiple outlet selector 18. Advantageously, multiple outlet selector 18 is capable to be arranged for rotating around its own axis.

Multiple outlet selector 18 comprises three openings 20, 21, 22 which are axially corresponding to respective outlets 15, 16, 17; advantageously, the three openings 20, 21, 22 are angularly offset in order to allow positioning according to one of above said three positions, i.e.:
first position being brought about by letting opening 20 of multiple outlet selector 18 coincide with said lower outlet 15; simultaneously, the other outlets 21 and 22 of multiple outlet selector 18 do not communicate with respective outlets 16 and 17, so that liquid can only flow through lower outlet 15;
second position being brought about by letting opening 21 of multiple outlet selector 18 coincide with said upper outlet 16; simultaneously, the other outlets 20 and 22 of multiple outlet selector 18 do not communicate with respective outlets 15 and 17, so that liquid can only flow through upper outlet 16;
third position being brought about by letting upper opening 22 of multiple outlet selector 18 coincide with said upper outlet 17; simultaneously, the other outlets 20 and 21 of multiple outlet selector 18 do not communicate with respective outlets 15 and 16, so that liquid can only flow through lower outlet 17.

It is to be noted that, for openings 20-22 to coincide with respective outlets 15-17 and for sealing engagement, openings 20-22 need to be provided with seals, which are advantageously provided by sealing lips 22, which are integral with the multiple outlet selector 18, and which are made of low density polyethylene.

Advantageously, the multiple outlet selector 18 comprises an integral rotatable knob 23, which protrudes upwardly and is rotatable, step by step, in order to select the outlet of said filtering unit. The knob 23 is positioned in an upward position, in order to facilitate the user grasping; therefore, preferably, the knob 23 is placed above water level, providing the user with the advantage of not contacting the liquid, when selecting a particular outlet.

Conveniently, the electric pump assembly 6 is placed in a lower position, and is therefore always contacting water; this allows for a better efficiency, since in this case, water is also a refrigerating medium. Moreover, this allows filters to be removed from above, once the lid 53 has been removed from casing 2.

The liquid path 4 is arranged in order to flow horizontally through filters; therefore, filtering chambers are arranged according to a horizontal sequence, providing a better replacement of filters from above, once the casing 2 has been opened; this is also greatly facilitated by the lower position of electric pump assembly 6. All these aspects give rise to an exceptional ease of use of filtering unit 1.

Figure 10:
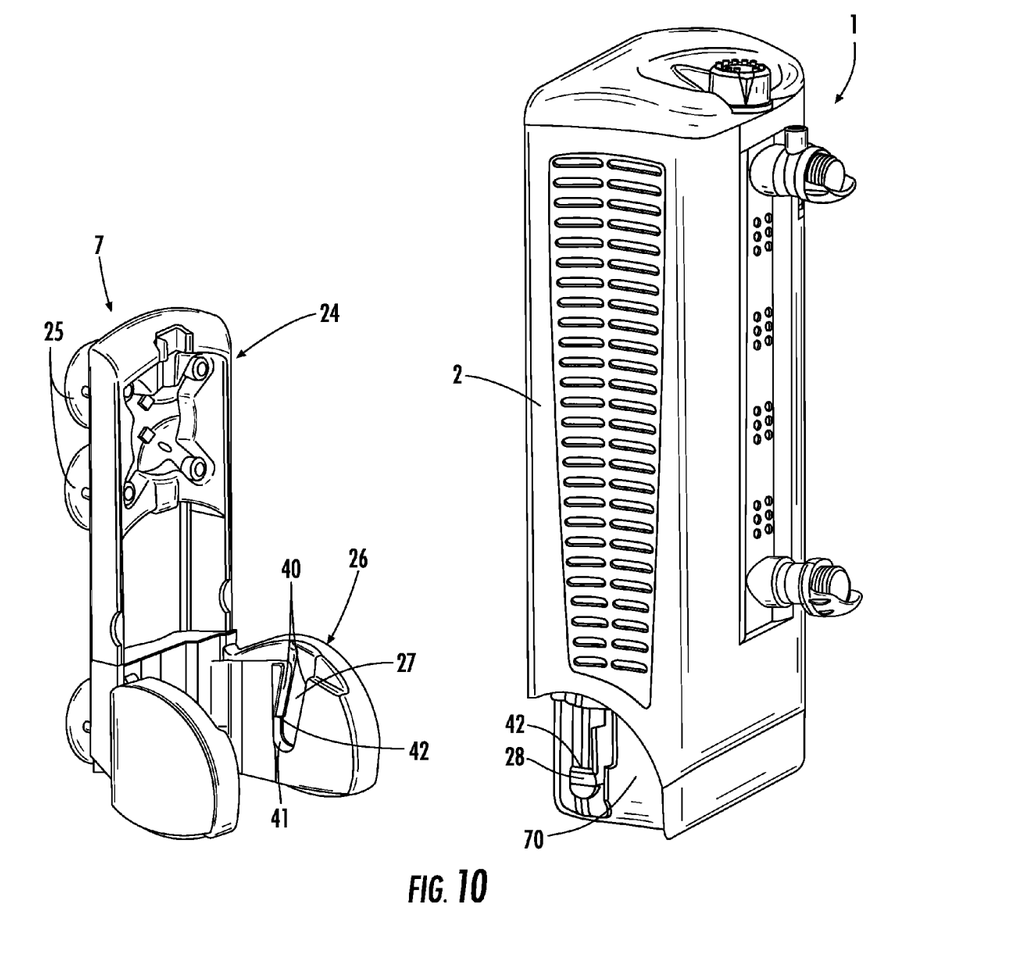
FIG. 10 shows a view of separated portions of filtering unit of FIG. 1 detached from supporting means.

The supporting body 7 is approximately shaped like a chair, and comprises a vertical wall 22 provided with suction cups 25 to be applied on a wall, and two horizontal elements 26 for supporting the casing 2 (and, thus, the filtering unit 1), by means of slots 27 receiving supporting pins 28 which are fixed, in particular integral with the casing 2, in particular with the lower enclosure 70, which houses the electric pump assembly 6.

Figure 9:
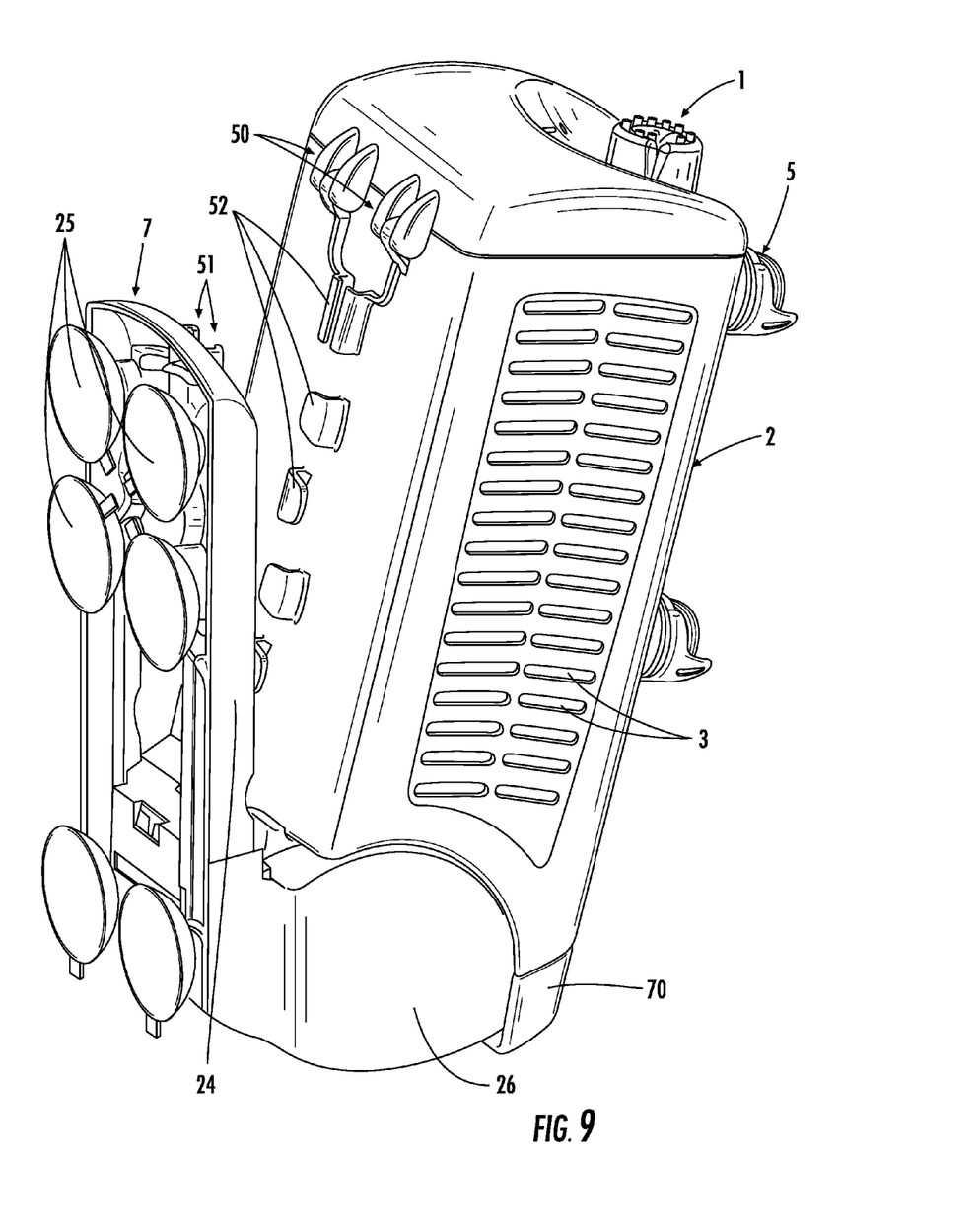
FIG. 9 shows a perspective view of filtering unit of FIG. 1, in an extracted position.

Slots 27 are formed with a first inclined guide 40, in order to allow insertion of pins 28 by moving them downwards in an inclined way, until they reach an extraction position, shown in FIG. 9; moreover, slots 27 comprise a rotational surface 41 such as to allow pins 28 to be rotated up to an operating position, shown in FIG. 1. Moreover, slots 27 comprise vertical blocking means 42 and pins 28 comprise vertical blocking counter-means 43 which interlock in a vertical direction, inhibiting a vertical movement of pins 28, so that casing 2 is held in a vertical blocked position.

Resilient interlocking means 50, which are fixed, in particular integral with casing 2, are interlockable with interlocking counter-means 51 integral with supporting body 7, so that filtering unit is not allowed to move from its operating position, without user intervention.

Casing 2 is fixed, and in particular integral, with supporting means 52 for a power supply cable, not shown since of the conventional type, wherein said supporting means 52 are disposed on the rear side of casing, and therefore are covered by supporting body 7, in its operating position.

The major advantage of the present invention resides in its intrinsic simplicity, but also in its capacity to allow different liquid circulations inside the tank, and hence different types of mixing. Thereby, upper outlet allows liquid outflow towards water surface, whereas lower outlet allows circulation of lower water layers inside the tank.

Moreover, if inlet means 3 are disposed on wide surfaces, a high water transpiration is allowed. Advantageously, if supporting means 3 are placed on a vertical face other than the face where inlet means 5 are positioned, a better liquid circulation is provided. It is also to be noted that thereby it is possible to completely peruse the wide lateral surface of casing 2.

Moreover, the invention minimizes occurrence of instances where user contacts liquid.

The invention claimed is:

1. A filtering unit for an aquarium, said filtering unit comprising:
a closed casing to be immersed in aquarium liquid,
inlet means for allowing inflow of said liquid,
a liquid path for forcing said liquid to pass through filters,
outlet means for allowing outflow of said liquid, and
an electric pump assembly for forcing said liquid to circulate along said liquid path,
wherein said outlet means comprise a lower outlet, an upper outlet vertically positioned above said lower outlet, and an intermediate outlet in an intermediate position with respect to said upper and lower positions,
wherein said outlet means comprise a multiple outlet selector, so as to allow selection of an outlet among the lower, upper and intermediate outlets,
wherein said multiple outlet selector may be positioned in:
a first position, which communicates said liquid path with said lower outlet and allows liquid to exit the filtering unit through said lower outlet,
a second position, which communicates said liquid path with said upper outlet, so that to allow the liquid to exit the filtering unit through said upper outlet, and
a third position, which communicates said liquid path with said intermediate outlet, allowing the liquid to exit the filtering unit through said intermediate outlet.

2. The filtering unit according to claim 1, wherein said intermediate outlet is of the spray type.

3. The filtering unit according to claim 1, wherein said multiple outlet selector comprises a tube with a substantially vertical axis, provided with three openings, axially corresponding to said lower, upper and intermediate outlets, to allow positioning at said first, second and third position, said three openings being angularly offset, such as to allow positioning at one of first, second and third position, so that an opening coincides with a respective outlet.

4. The filtering unit according to claim 3, wherein said openings comprise seals formed by sealing lips, which are integral with the multiple outlet selector, and are made of suitable plastic material, in particular low density polyethylene.

5. The filtering unit according to claim 1, wherein said multiple outlet selector comprises an upwardly protruding knob, which is rotatable, step by step, for selecting an outlet of said filtering unit.

6. The filtering unit according to claim 1, further comprising a supporting body to be applied on a tank wall, said supporting body being able to support said casing, by means of slots which may receive supporting pins which are fixed, and in particular integral with said casing.

7. The filtering unit according to claim 6, wherein said slots comprise a first inclined guide, for inserting said supporting pins by means of a downward inclined movement, up to an extraction position, the slots comprising a rotational surface such as to allow rotation of said supporting pins up to an operating position, said slots comprising vertical blocking means and said supporting pins comprising vertical blocking counter-means, which vertically interlock with each other, inhibiting a vertical displacement of said supporting means, such as to hold said casing blocked in a vertical direction.

8. The filtering unit according to claim 1, wherein said casing is closed by a lid, which is placed in an upper position, said electric pump assembly being placed in a lower position, in order to allow removal of filters from above, once said lid has been removed.

* * * * *